United States Patent [19]

McClain et al.

[11] E Re. 30,134

[45] Reissued Oct. 30, 1979

[54] PROTECTION OF POLYPHASE EQUIPMENT

[75] Inventors: James E. McClain; Howard L. Scott, both of Greenville, Tex.

[73] Assignee: ESCO Manufacturing Company, Greenville, Tex.

[21] Appl. No.: 843,713

[22] Filed: Oct. 20, 1977

Related U.S. Patent Documents

Reissue of:

[64] Patent No.: 4,024,439
Issued: May 17, 1977
Appl. No.: 580,060
Filed: May 22, 1975

[51] Int. Cl.[2] ..... H02H 3/26
[52] U.S. Cl. ..... 361/76
[58] Field of Search ..... 361/76, 87

[56] References Cited

U.S. PATENT DOCUMENTS

| | | | |
|---|---|---|---|
| 1,806,392 | 5/1931 | Genkin | 361/76 |
| 1,939,046 | 12/1933 | Fortescue et al. | 361/76 |
| 2,296,784 | 9/1942 | Harder | 317/47 |
| 3,209,204 | 9/1965 | Rockefeller | 317/47 X |
| 3,462,646 | 8/1969 | Bell | 317/22 |

*Primary Examiner*—Harry E. Moose, Jr.
*Attorney, Agent, or Firm*—Kenneth R. Glaser

[57] ABSTRACT

Motor protector apparatus for independently sensing the respective positive, negative, and zero sequence currents flowing in the supply lines to a three phase motor for interrupting power to the motor whenever such positive, negative, or zero sequence components reach levels indicative of abnormal operating conditions. The protector network includes bridge means for segregating the negative and positive sequence components, indicators for visually displaying the source of the abnormality, and means for restoring power to the motor after a defined time period.

13 Claims, 4 Drawing Figures

PROTECTION OF POLYPHASE EQUIPMENT

Matter enclosed in heavy brackets [ ] appears in the original patent but forms no part of this reissue specification; matter printed in italics indicates the additions made by reissue.

This invention relates to protection for polyphase electrical equipment, more particularly to a method and apparatus for interrupting the flow of electrical power to three phase motors upon the occurrence of certain abnormal operating conditions, and even more particularly to apparatus for responding to, as well as indicating the nature of, the abnormal operating condition.

The effective and safe operation of electrical machinery, such as three phase motors, requires the incorporation of protective apparatus of the type which interrupts power to the motor upon the occurrence of certain abnormalities in the system. For example, the polyphase power for the motor is normally obtained from a source, usually a commercial generating plant, which also supplies power, by way of a distribution network and upon demand, to numerous other equipment. The consequent load variations in the distribution system then often result in excessive imbalances in the magnitude and phase relationships of the line voltages supplied to the motor. Additionally, loss of phase (single phasing in a three phase source) and line faults can occur due to failures at the generating station or in the distribution transformers; and excessive or insufficient motor shaft loading may produce unsuitable overload or underload conditions.

Each of the above abnormalities can result in damage to the electrical machinery; and effective means must therefore be provided to sense these abnormal conditions and remove the motor from the line prior to such damage. Various types of motor protective apparatus have been developed for this purpose; but, to date, they have not been completely satisfactory for all conditions of service.

For example, the most common type of protective apparatus for interrupting the power to the motor includes a detector responsive only to excessive line currents in the motor network. Among the difficulties with this current responsive [techinque] *technique* is that unsymmetrical circuit conditions (imbalances in the magnitude and phase relationship of the line voltages) produce what is referred to as negative sequence currents which produce more heat per ampere in the motor than that resulting from the normal positive sequence currents. Furthermore, the negative sequence currents have a phase sequence which is opposite to that phase sequence of the positive sequence currents. Thus, since the line current detectors incorporated in these state-of-the-art protectors can only detect the resultant (vector sum) magnitude of the line currents, negative sequence currents may be present in the line having a magnitude which would generate sufficient heat to damage the motor; but the resultant line current (due to the vector cancellation of the positive and negative sequence components) may not be large enough to actuate the detector to interrupt power to the motor. [Additonally] *Additionally*, if the line current detector was somehow calibrated to take into account or anticipate this vector cancellation, the power to the motor may be prematurely interrupted under normal load conditions.

Other types of detectors directly responsive to the voltage and phase imbalances have been utilized; but to provide the full range of protection for the motor, it is then necessary to add other types of detectors for sensing current faults, shaft overloads and underloads, etc., thus prohibitively adding to the entire cost of the protective apparatus. Additionally, the use of thermal overload relays of the type having tripping characteristics corresponding *closely* to the heating characteristics of the motor, as well as other types of mechanical or electromechanical protective devices, have not been entirely reliable or involve excessive costs.

It is therefore a principal object of the present invention to provide a new and improved method and apparatus for protecting polyphase electrical equipment.

It is another object of the present invention to provide a new and improved method and apparatus for selectively responding to a large variety of abnormal circuit conditions in a motor network in order to interrupt power to the motor.

It is still further object of the present invention to provide new and improved motor protective apparatus which is not only responsive to, but also identifies the source of, the abnormal operating conditions.

In accordance with these and other objects, the present invention relies upon the principle that the currents flowing in an unsymmetrical or unbalanced three phase network can be resolved into three balanced systems of phasors, to-wit; (1) positive sequence currents consisting of three phasors equal in magnitude, displaced from one another by 120° in phase, and having the same *phase* sequence as the line voltages; (2) negative sequence currents consisting of three phasors equal in magnitude, displaced from one another by 120° in phase, and having a phase sequence opposite to that of the positive sequence currents; and (3) zero sequence currents consisting of three phasors equal in magnitude and with a zero displacement from one another; and that each of the circuit abnormalities which should result in the interruption of power to the motor can be uniquely related to the level of the positive, negative, or zero sequence currents flowing in the motor network.

Accordingly, the motor protective apparatus of the present invention includes means for independently sensing the respective positive, negative, and zero sequence current levels and activating a relay to interrupt power to the motor whenever the respectively sensed current levels, or combinations thereof, indicate a particular abnormal operating condition. Included within the apparatus in a bridge network for segregrating the positive and negative sequence components and means coupled to the lines for separately detecting the presence of excessive zero sequence currents. As a unique feature of the invention, individual display devices are also provided for identifying and indicating the nature of the abnormality which caused the power interruption.

Additional features, objects, and advantages of the present invention can be more completely understood from the following detailed description taken in conjunction with the accompanying drawings, wherein.

Figure 1:
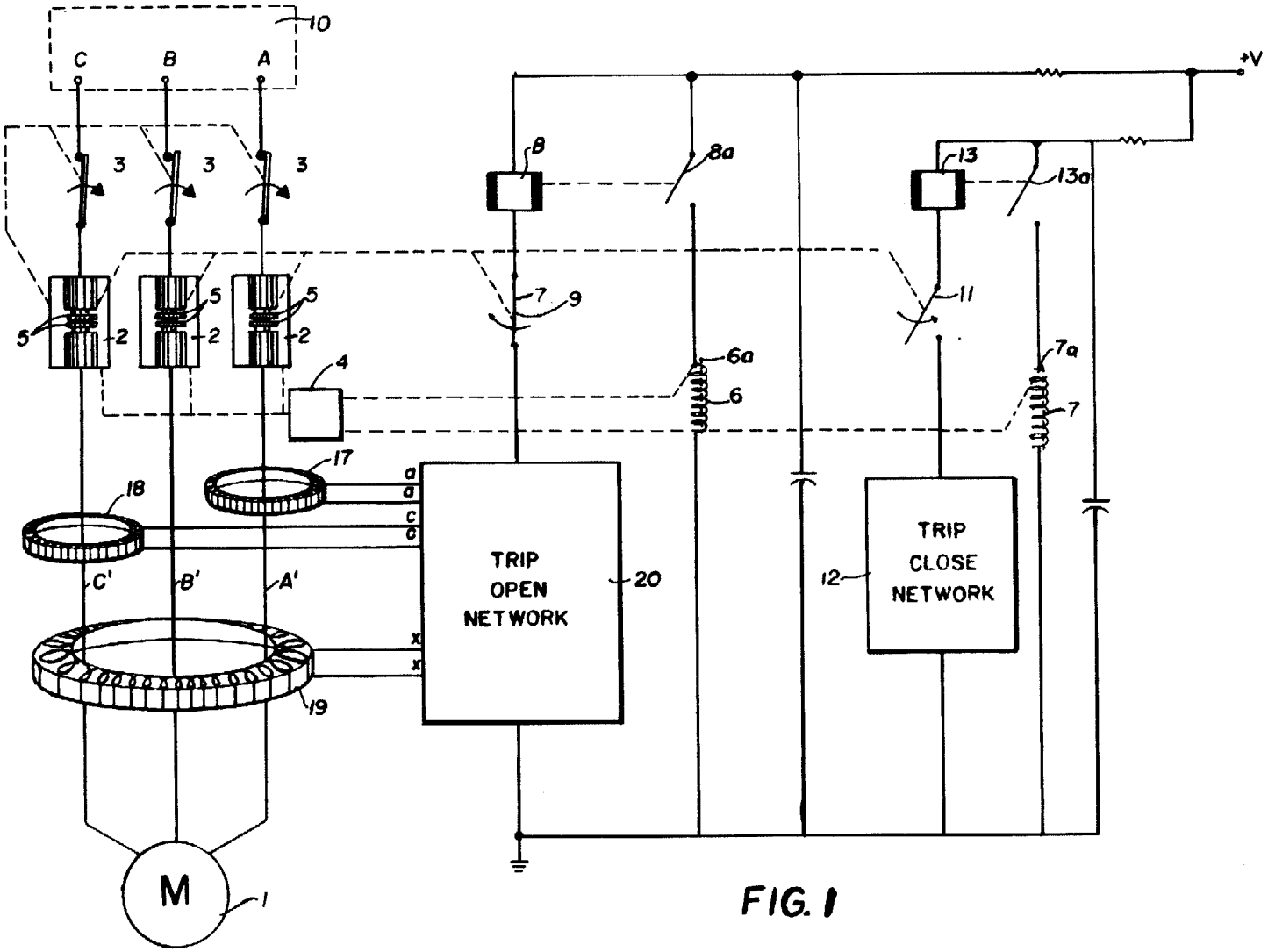
FIG. 1 is a diagrammatic illustration showing the overall layout of the protective apparatus of the present invention.

Referring initially to FIG. 1, a conventional induction motor 1 receives three phase power by way of lines A', B', and C' from a source 10, the resulting supply voltages appearing across the input terminals A, B, and C. For convenience of illustration, the details of the source 10 are not shown; but, as well known in the art, would typically include a conventional distribution network transferring electrical power from the main generating plant.

Respectively disposed within the lines between the supply voltage terminals and the motor 1 are a plurality of conventional vacuum switches or interrupters 2 of the type having coaxially disposed contacts 5, one of which is adapted for reciprocal translation to and from contact with the other, thereby to respectively close and open the switch. If desired, a separate set of air break switches 3 may be connected in series with the vacuum interrupters 2 and are mechanically interconnected therewith so that visual observation of the position of the switches 3 also indicates the open or closed status of the vacuum interrupters. Additionally, conventional means (not shown) may be employed to initially close the switches 3 prior to the closing of the vacuum interrupters.

Mechanically linked with the vacuum interrupters 2 is switch operator apparatus 4 which is effective, upon command, to open or close the contacts 5 of each interrupter. The switch operater apparatus 4 is also mechanically coupled to solenoid plungers 6a and 7a for respectively opening and closing the vacuum interrupters 2. Specifically, the translation of the solenoid plunger 6a (in the manner subsequently described) is effective to cause the switch operator apparatus 4 to translate a movable contact carrier rod in each of the vacuum interrupters to separate the contacts 5, thereby opening the interrupters 2 and interrupting power to the motor. Similarly, the translation of the solenoid plunger 7a (in the manner subsequently described) is effective to cause the switch operator apparatus 4 to translate the contact carrier rods to engage the contacts 5, thereby closing the switches 2 and reestablishing power to the motor.

A trip open network 20 is connected in series through a normally closed switch 9 to an electromagnetic relay 8, the network 20 being effective, upon command, to energize the coil of the relay 8. The energizing of this relay then closes a set of associated contacts (represented as normally open switch 8a), which consequently electrically energizes a solenoid coil 6 to translate the solenoid plunger 6a.

In a preferred embodiment of the present invention, the trip open network 20 is essentially a normally open switch which, when closed, causes sufficient voltage to appear across the relay coil 8 (assuming the switch 9 is closed) to energize the same. The closing of network 20 occurs in response to certain abnormal motor circuit conditions being sensed by current transformers 17, 18, and 19 which are respectively inductively coupled with the motor supply lines A' and C', as well as with all the lines A', B', and C', and whose outputs are respectively connected as the inputs (a—a, c—c, x—x) to the network 20. The details and operation of the network 20 will be subsequently described in greater detail, it being sufficient at this point to note that the actuation or closing of the network 20 is commanded by the magnitude of the voltages appearing across these input terminals.

Referring again to FIG. 1, a trip close network 12 is connected in series through a normally open switch 11 to an electromagnetic relay 13, the network 12 being effective, upon command, to energize the coil of relay 13. The energizing of this relay then closes a set of associated contacts (represented as normally open switch 13a), which consequently electrically energizes a solenoid coil 7 to translate the solenoid plunger 7a. The trip close network 12 also is essentially a normally open switch which, when closed, causes sufficient voltage to appear across the relay coil 13 (assuming switch 11 is closed) to energize same. The details and operation of the network 12 will be subsequently described in greater detail, it being sufficient at this point to note that the actuation or closing of network 12 may be effected manually or, as subsequently described, automatically at some time period after, and in response to, the opening of interrupters 2.

The vacuum interrupters 2 are mechanically ganged together as well as with the switches 9 and 11 so that the opening of the vacuum interrupter contacts 5 also opens the normally closed switch 9 while simultaneously closing the normally open switch 11. Similarly, the closing of the vacuum interrupters closes the switch 9 while simultaneously opening the switch 11.

In accordance with the overall operation of the protective apparatus depicted in FIG. 1, assume that the vacuum interrupters 2 are in their normally closed position with the electrical power therefore flowing to the motor 1. Upon the occurrence of certain abnormal circuit conditions in the motor network [transmtted] *transmitted* by the current transformers 17–19 coupled with the three phase supply lines A', B', and C', the trip open network 20 will be actuated, energizing the relay 8 (and closing contacts 8a), thus energizing the solenoid coil 6 to electromagnetically translate the solenoid plunger 6a. The translation of the solenoid plunger 6a then causes the switch operator apparatus 4 to open the vacuum interrupters 2 to interrupt the power to the motor 1. The opening of the vacuum interrupters 2 then mechanically opens the switch 9 and simultaneously closes the switch 11.

Thereafter, the actuation of the network 12 energizes the relay 13 (closing contacts 13a), thus energizing the closing solenoid 7 to translate the solenoid plunger 7a. The translation of the plunger 7a then causes the switch operator apparatus 4 to [mechanicly] *mechanically* close the contacts 5 of the vacuum interrupters, thereby [reesetablishing] *reestablishing* power to the motor 1.

Figure 2:
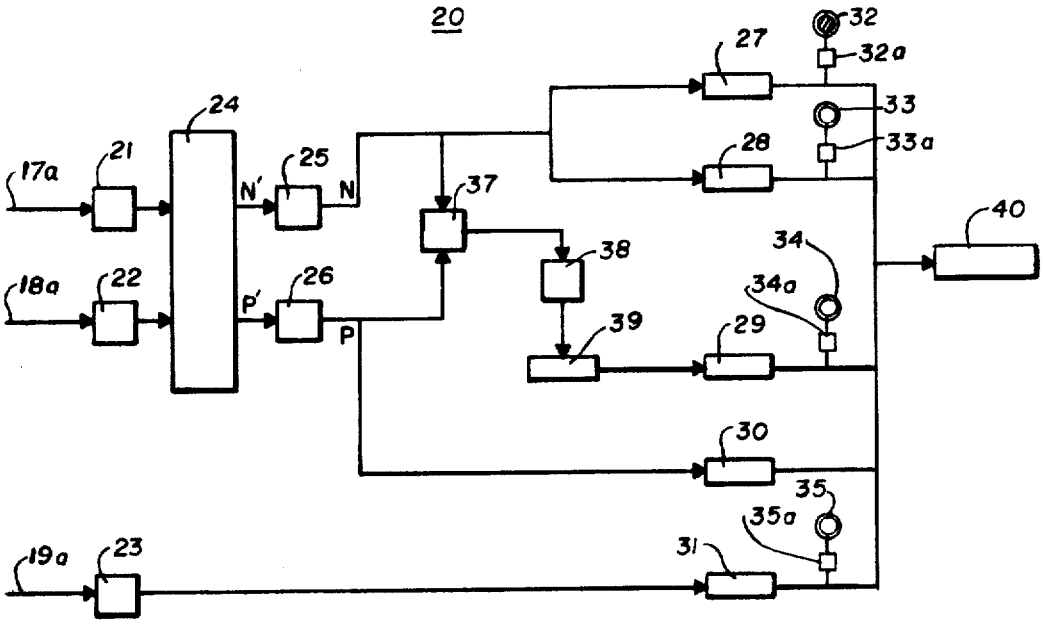
FIG. 2 is a block diagram of the network for activating the relay shown in FIG. 1 to interrupt power to the motor.
Figure 3:
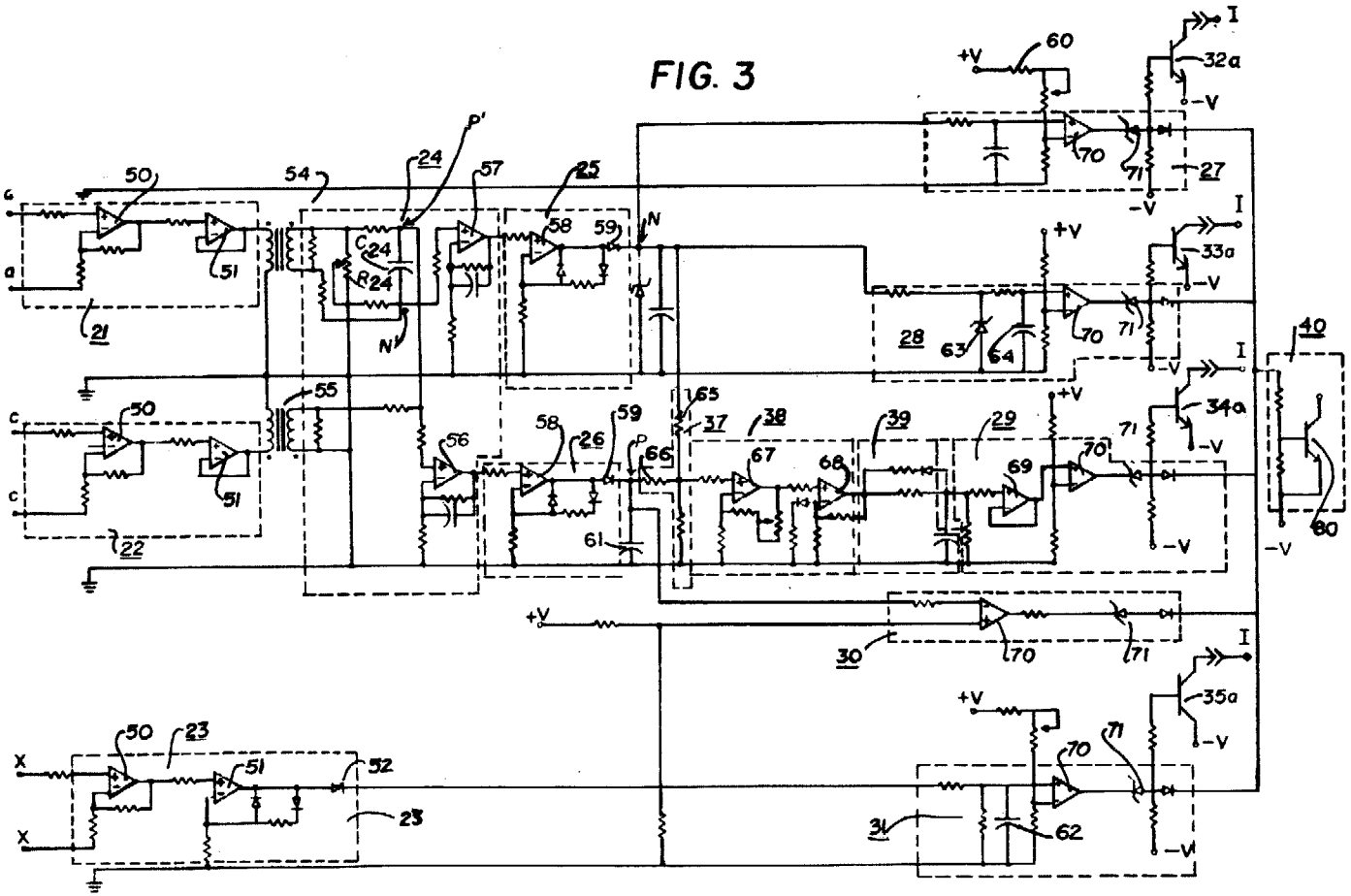
FIG. 3 is a detailed schematic of the network depicted in FIG. 2.

Referring now to FIGS. 2 and 3, and with initial reference to FIG. 2, the specific details and operation of the trip open network 20 is now described. Accordingly, the output signals (designated in FIG. 2 by arrows 17a and 18a) from the current transformers 17 and 18 are coupled to the respective inputs of amplifiers 21 and 22. Each of the signals 17a and 18a would [repsectively] *respectively* represent the voltages appearing across terminals a—a and c—c and is therefore proportional to the magnitude of the line currents in lines A' and C'. The amplifiers 21 and 22 are effective to increase the magnitude of these voltages to amplitudes suitable for subsequent processing.

The outputs from these [amlifiers] *amplifiers* are then coupled to respective inputs of a bridge network 24, the function of which is to segregate the negative and positive sequence components of the line currents and to produce signals at the output terminals N' and P' respectively proportional to the magnitude of these negative and positive sequence currents.

The outputs from the bridge network 24 are then respectively coupled to converters 25 and 26 which are effective to amplify and convert the a—c signals from the bridge to d—c signals of suitable magnitude. Normally, the converter 25 will be set to introduce a greater amount of gain to the "negative sequence component" signal appearing at its input than the gain introduced by the converter 26 to the "positive sequence component" signal.

It is thus observed that the presence and magnitude of any negative sequence current in the motor supply lines will be essentially represented by the d—c voltage which may appear at the output N of converter 25; while the magnitude of the positive sequence component of the line currents will be represented by the d-c voltage which appears at the output P of converter 26. These two signals, or combinations thereof, may then be utilized to detect various abnormal conditions in the motor network, as now discussed.

Coupled to the output of the converter 25 is a pair of level detectors 27 and 28 effective to generate a trigger signal to relay drive means 40 whenever the voltage at their respective inputs reaches a predetermined value. As subsequently described with reference to FIG. 3, the input voltage required to trigger level detector 27 is greater than that required to trigger level detector 28; and means are associated with detector 28 so that the presence of a voltage signal at the output of converter 25 having a magnitude sufficient to trigger both level detectors 27 and 28 will only trigger detector 27.

Thus, the detector 27 is effective to activate the relay driver, 40 whenever there is rapid and excessive rise in negative sequence currents in the supply lines to the motor (which will occur in the event of loss of voltage at either of the input terminals A, B or C); while the detector 28 is effective to trigger the driver 40 under all other unsymmetrical line conditions which result in the negative sequence currents increasing above a predetermined and potentially dangerous minimum.

A level detector 30 is coupled to the output of converter 26 and is effective to generate a trigger to activate the relay driver 40 whenever the voltage at its input from converter 26 drops below a predetermined value. Thus, the detector 30 is responsive to motor shaft underload indicated by the reduction in positive sequence line currents.

In addition to the aforestated conditions, it is necessary to interrupt power to the motor whenever either (1) shaft overload (represented by excessive positive sequence currents) or (2) a combination of negative sequence currents (below that necessary to trigger detectors 27 or 28) and normal shaft load would produce deleterious heating of the motor. Accordingly, the negative sequence and positive sequence d-c voltages from converters 25 and 26 are combined in a summing means 37, the resulting combined voltage being inputted to a squaring amplifier 38 which is therefore effective to produce a voltage at its output approximating the heating characteristics of the motor as a consequence of positive and negative sequence currents flowing therein. The output of the squaring amplifier 38 is then coupled through a timing network 39 (which simulates the heat rise time in the motor) to a level detector 29 which generates a trigger signal to the driver 40 when the voltage at its input exceeds a predetermined level. This level would, of course, be that value which represents unacceptable heating due to excessive shaft load or normal shaft load plus negative [sequenc] *sequence* currents.

The network 20 is also effective to generate a trigger signal to relay driver 40 under certain abnormal motor circuit conditions (for example, line to ground faults in a wye connected source) which produce excessive zero sequence line currents. Accordingly, the current transformer 19 is inductively coupled with all of the supply lines A', B', and C' and any output therefrom (designated in FIG. 2 by arrow 19a) will appear as a voltage across the terminals x—x (depicted in FIG. 1). Since the current transformer 19 is coupled to all three lines, any voltage appearing across the terminal x—x is representative of only zero sequence line currents since the vector sum of the negative components or the vector sum of the positive sequence components of the line currents would be essentially zero.

Continuing, the output of current transformer 19 is coupled to the input of an amplifier/converter 23 which is effective to amplify and rectify the input voltage, the resulting d-c voltage at the output of converter 23 (which would therefore be proportional to zero sequence line currents) being applied at the input to a level detector 31. The detector 31 is then effective to trigger the driver 40 when these zero sequence currents exceed a predetermined minimum.

The relay drive means 40 is, in effect, a switch which is closed in response to the receipt of a trigger signal from any one of the level detectors 27–31. In a preferred embodiment, and as subsequently described in greater detail, the driver 40 could be a transistor, the conduction of which activates the relay coil 8.

As a unique feature of the present invention, each of the level detectors 27–29 and 31 would have associated therewith respective indicators 32–34, and 35 which are activated (by way of associated drivers 32a, 33a, etc.) in response to the operation of its corresponding detector. In the illustrated example of FIG. 2, each indicator would be a disc or "target" which revolves or changes state to give a visual indication of which level detector (and therefore which abnormality) caused the interruption of power to the motor. Thus, as indicated in FIG. 2, the rotation of the target disc 32 to its "shaded" side means that it was a phase loss that caused the power interruption. Alternatively, the indicators 32–35 could be lamps which are illuminated in response to the actuation of the associated level detector.

Referring now to FIG. 3, a preferred embodiment of the network 20 is illustrated. Accordingly, each of the amplifier networks 21, 22, and 23 comprises a first operational amplifier 50 for increasing the voltages from the current transformers 17, 18 and 19 and a second isolation amplifier 51. The zero sequence amplifier network 23 includes an additional stage, including diode 52, for converting the a-c signal 19a from operational amplifier 51 to a d-c voltage.

The output voltages from the amplifier networks 21 and 22 are respectively coupled by way of transformers 54 and 55 to the bridge network 24, as illustrated in FIG. 3. The [bridg] *bridge* 24 includes a 60° phase shift network variable resistor $R_{24}$ and capacitor $C_{24}$ and is effective to respectively segregate the positive and negative sequence components of the incoming voltages at the terminals P' and N'. The positive sequence and negative sequence voltages are then respectively amplified and filtered to eliminate all but the 60 cycle frequency by the portion of the bridge network including amplifiers 56 and 57 and their associated components.

The converters 25 and 26 each include operational amplifiers 58, diodes 59, and related components for amplifying and converting the input voltages to d-c voltages respectively representative of the negative sequence and positive sequence line current components appearing at the output terminals N and P.

At the heart of each of the level detector networks 27—31 is an operational amplifier 70, the output of which is connected to the input of a zener diode 71. Whenever a sufficient voltage difference appears across the positive and negative input terminals of the amplifier 70, an output signal is generated to break down the zener diode 71, thereby furnishing the trigger signal to the base, thus causing the conduction, of a transistor 80 of the relay drive network 40. The output of transistor 80 is connected in series with the relay coil 8 so that its resultant conduction activates that relay.

The negative input terminal of the operational amplifiers of level detectors 27 and 28 is biased from a positive voltage supply, a variable resistor 60 being included, as illustrated in detector network 27 to insure that the magnitude of the voltage (at terminal N) necessary to actuate the amplifier of detector 27 is greater than that necessary to actuate the amplifier of detector 28. Additionally, a zener diode 63 having a breakdown voltage approximate that necessary to trigger detector 27 is connected to the positive input of the amplifier of detector network 28 to insure that the detector 27, and not detector 28, is triggered under such excessive voltage circumstances, the capacitor 64 introducing a sufficient time delay to enable the breakdown of diode 63 prior to detector 28 being actuated.

The positive input terminal of the operational amplifier of underload level detector network 30 is positively biased so that the detector 30 is actuated whenever the voltage level at terminal P (representing shaft load) drops below a predetermined minimum. Means, such as capacitor 61, is effective to introduce a time delay to prevent actuation under starting or transient conditions.

The negative input terminal of the operational amplifier of zero sequence detector 31 is positively biased so that the detector is only actuated when the voltage from amplifier/converter 23 exceeds a predetermined minimum, the capacitor 62 introducing sufficient delay to avoid tripping on temporary faults.

The negative sequence and positive sequence d-c voltages at the terminals N and P are combined by way of resistors 65 and 66 in the adder network 37, the resultant voltage being approximately squared by [opertional] *operational* amplifiers 67 and 68 (and associated components) forming the squaring amplifier network 38. The timing network 39 coupled intermediate the output of the squaring amplifier network 38 and the detector network 29 is effective to simulate the heating rise time in the motor and introduce a suitable time delay at the input of level detector 29 to prevent its actuation under temporary overload conditions. The level detector 29 is similar in construction and biasing as previously described with respect to the other detectors (specifically, detector 28) and furthermore includes an isolation amplifier stage 69 at the input of its operational amplifier 70.

In accordance with a preferred embodiment, the indicator drivers 32a–35a are provided by NPN transistors having their respective base inputs coupled to the output of the zener diodes 71, the breakdown of these diodes then triggering the associated transistor into conduction. The collector output of each of these transistor drivers is [connected] *connected* to the respective indicators 32–35 (by way of terminals I) so that the conduction of the transistor would activate the particular indicator. For example, the output terminal I could be connected with a coil for electromagnetically rotating a target disc or, alternatively, could be connected with a lamp for supplying illumination current thereto.

Figure 4:
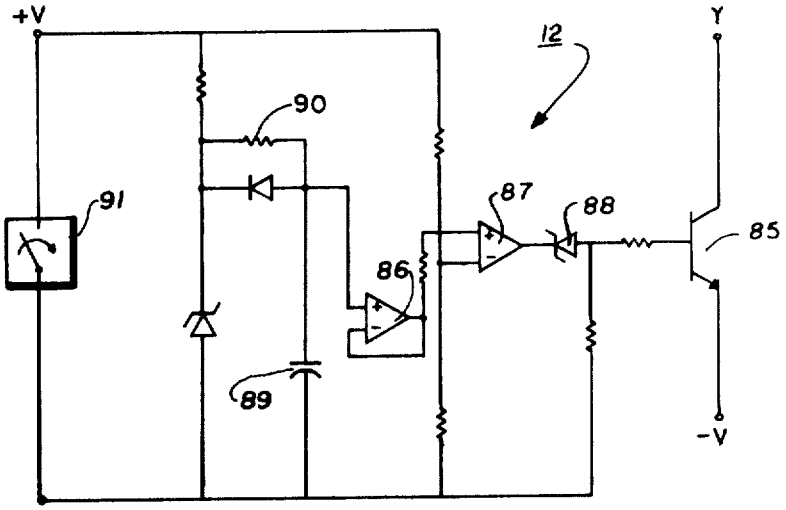
FIG. 4 is a detailed schematic of the network depicted in FIG. 1 for reestablishing power to the motor.

Referring now to FIG. 4, the details and operation of a preferred embodiment of the trip close network 12 is now described. Accordingly, an NPN transistor switch 85 has its collector output coupled (by way of terminal Y) with the relay coil 13 (FIG. 1) so that the conduction of the transistor (in response to a suitable trigger signal being applied at its base) energizes the coil 13. The trigger signal would be [suppled] *supplied* to the base of the transistor 85 by way of operational amplifiers 86, 87, and zener diode 88 in response to a positive voltage of sufficient magnitude being applied to the positive input terminal of the amplifier 86. This positive input signal would, in turn, be supplied by a capacitor 89 (in series with resistor 90) which is suitably charged when the switch 91 is open. The switch 91 is coupled (by means not shown) to the interrupters 5 in a manner whereby the opening of the interrupters 5 opens switch 91 and the closing of these interrupters closes the switch 91.

In accordance with the operation of the network 12, whenever the circuit interrupters 5 are opened in response to the actuation of the trip open network 20 (as previously described), the switch 91 will consequently open and, after a period of time determined by the charging time of the capacitor 89, the operational amplifier 86 (and 87) will be activated to break down the zener diode 88, thus furnishing the required trigger signal to the base of the transistor 85. The resultant conduction of the transistor 85 energizes the relay coil 13, resulting in the timed reclosing of the vacuum interrupters. The consequent closing of the vacuum interrupters will then close switch 91, resulting in a reduction of the voltage at the positive *input* terminal of amplifier 86, and the transistor 85 will cease conduction. Thus, it is observed that the network 12 is effective to automatically reclose the vacuum interrupters at some time period after, and in response to, their opening. Alternatively, the trip close network can be manually operated to effect the closing of the interrupters.

Various modifications to the disclosed embodiments, as well as alternate embodiments, may become apparent to one skilled in the art without departing from the spirit and scope of the invention as defined by the appended claims.

What is claimed is:

1. Protective apparatus for interrupting the flow of electrical power from a polyphase source to a load, comprising:

a. line interrupter means disposed in supply lines between said source and said load switchably actuated between open and closed positions for respectively disconnecting and connecting said source and said load, b. sensing means for producing first, second, and third signals respectively representative of the positive sequence, negative sequence, and zero sequence components of the line currents in said supply lines, and c. condition responsive network means for [acutating] *actuating* said line interrupter means to said open position, said condition responsive network means comprising:

i. first means responsive to said second signal and nonresponsive to said first or third signals for actuating said line interrupter when the magnitude of said negative sequence component exceeds a prescribed threshold value, ii. second means responsive to said first and second signals and nonresponsive to said third signal for actuating said line interrupter when the combination of the magnitudes of said positive and negative sequence components exceeds a prescribed threshold value, and iii. third means responsive to said third signal and nonresponsive to said first and second signals for actuating said line interrupter when the magnitude of said zero sequence component exceeds a prescribed threshold value.

2. The apparatus as defined by claim 1 further including means responsive to the opening of said line interrupter means for reclosing the said line interrupter means, thereby to restore power to the load.

3. Protective apparatus for disconnecting a three phase supply from a motor in response to selected network abnormalities, said apparatus [comprsing] *comprising*:

a. line interrupter means disposed in supply lines between said supply and said motor switchably actuated between open and closed positions for respectively disconnecting and connecting said supply and said motor, b. first means coupled to two of said supply lines for producing a pair of voltage signals respectively representative of the magnitude of current in said two supply lines, c. second means for segregating the negative sequence and positive sequence components of said pair of voltage signals and generating first and second voltages respectively representative of said negative and positive sequence components, d. third means coupled to said second means for actuating said line interrupter means to said open position when said first voltage exceeds a predetermined minimum, e. fourth means coupled to said second means for actuating said line interrupter means to said open position when a combination of said first and second voltages exceeds a predetermined minimum, and f. fifth means coupled to said second means for actuating said line interrupter means to said open position when said second voltage drops below a predetermined minimum.

4. The apparatus as defined by claim 3 further including indicator means coupled to at least one of said third, fourth, and fifth means for giving a visual indication of which of said third, fourth, or fifth means actuated said line interrupter means.

5. The apparatus as defined by claim 3 wherein said first means is a pair of current transformers and said second means is a bridge network for receiving signals from said current transformers.

6. The apparatus as defined by claim 3 further including sixth means for sensing the zero sequence component of the current in said supply lines and for actuating said line interrupter means to said open position when the magnitude of said zero sequence component exceeds a predetermined minimum.

7. Protective apparatus for disconnecting a three phase supply from a load in response to selected network abnormalities, [and] *said* apparatus comprising:

a. line interrupter means disposed in supply lines between said supply and said load switchably actuated between open and closed positions for respectively disconnecting and connecting said supply and said load, b. first means coupled to two of said supply lines for producing a pair of voltage signals respectively representative of the magnitude of current in said two supply lines, c. second means for segregating the negative sequence and positive sequence components of said pair of voltage signals and generating first and second voltages respectively representative of said negative and positive sequence components.

d. third means coupled to said second means and responsive solely to the magnitude of the first of said first and second voltages for actuating said line interrupter means to said open position when the magnitude of said first voltage exceeds a prescribed threshold, and e. fourth means coupled to said second means for generating a signal representative of the combination of said first and second voltages and for actuating said line interrupter means to said open position when said generated signal exceeds a prescribed threshold.

8. The apparatus as defined by claim 7 wherein said third means comprises a pair of level detectors adapted to be triggered at respectively different magnitudes of said first voltage.

9. Protective apparatus for disconnecting a three phase supply from a load in response to selected network abnormalities, said apparatus comprising:

a. line interrupter means disposed in supply lines between said supply and said load switchably actuated between open and closed positions for respectively disconnecting and connecting said supply and said load, b. first means coupled to two of said supply lines for producing a pair of signals respectively representative of the magnitude of current in said two supply lines, c. second means for segregating the negative sequence and positive sequence components of said pair of signals and generating first and second signals respectively representative of said negative and positive sequence components.

d. third means coupled to said second means for actuating said line interrupter means to said open position when said first signal exceeds a predetermined threshold, e. fourth means coupled to said second means for actuating said line interrupter means to said open position when a combination of said first and second signals exceeds a predetermined threshold, and f. fifth means coupled to said second means for actuating said line interrupter means to said open position when said second signal drops below a predetermined threshold.

*10. Protective apparatus for interrupting the flow of electrical power from a polyphase source to a load; comprising:*

*a. line interrupter means disposed in supply lines between said source and said load switchably actuated between open and closed positions for respectively disconnecting and connecting said source and said load,*

*b. means for producing first and second signals respectively representative of the positive sequence and negative sequence components of the line currents in said supply lines, and*

*c. condition responsive network means for actuating said line interrupter means to said open position, said condition responsive network means comprising:*

*i. first means responsive to said second signal and nonresponsive to said first signal for actuating said line interrupter means when the magnitude of said negative sequence component exceeds a prescribed threshold value, and*

*ii. second means responsive to said first and second signals for actuating said line interrupter means when the combination of the magnitudes of said positive and negative sequence components exceeds a prescribed threshold value.*

*11. Protective apparatus for interrupting the flow of electrical power from a polyphase source to a load, comprising:*

*a. line interrupter means disposed in supply lines between said source and said load switchably actuated between open and closed positions for respectively disconnecting and connecting said source and said load,*

*b. means for producing first and second signals respectively representative of the positive sequence and negative sequence components of the line currents in said supply lines, and*

*c. condition responsive network means for actuating said line interrupter means to said open position, said condition responsive network means comprising:*

*i. first means responsive to said first signal and nonresponsive to said second signal for actuating said line interrupter means when the magnitude of said positive sequence component passes through a prescribed threshold value, and*

*ii. second means responsive to said first and second signals for actuating said line interrupter when the combination of the magnitudes of said positive and negative sequence components exceeds a prescribed threshold value.*

*12. Tripping network means for generating a tripping signal in response to changes in status of the positive sequence and negative sequence components of polyphase line currents, said tripping network means comprising:*

*(a) means for producing first and second signals respectively representative of the positive sequence and negative sequence components of said line currents, and*

*(b) condition responsive network means for generating said tripping signal, said condition responsive network means comprising:*

*i. first means responsive to said second signal and nonresponsive to said first signal for generating said tripping signal when the magnitude of said negative sequence component exceeds a prescribed threshold value, and*

*ii. second means responsive to said first and second signals for generating said tripping signal when the combination of the magnitudes of said positive and negative sequence components exceeds a prescribed threshold value.*

*13. Tripping network means for generating a tripping signal in response to changes in status of the positive sequence and negative sequence components of polyphase line currents, said tripping network comprising:*

*(a) means for producing first and second signals respectively representative of the positive sequence and negative sequence components of said line currents, and*

*(b) condition responsive network means for generating said tripping signal, said condition responsive network means comprising:*

*i. first means responsive to said first signal and nonresponsive to said second signal for generating said tripping signal when the magnitude of said positive sequence component passes through a prescribed threshold value, and*

*ii. second means responsive to said first and second signals for generating said tripping signal when the combination of the magnitudes of said positive and negative sequence components exceeds a prescribed threshold value.*

* * * * *